United States Patent
Shah et al.

(10) Patent No.: US 12,454,103 B2
(45) Date of Patent: Oct. 28, 2025

(54) INDUCTION HEAT SEALABLE CLOSURE LINER CONFIGURED FOR PAPER OR PLASTIC RECYCLING STREAM, AND INDUCTION HEAT SEAL APPLICATION DEVICE

(71) Applicant: Tekni-Plex, Inc., Wayne, PA (US)

(72) Inventors: Munish Shah, Sylvania, OH (US); Dennis Carespodi, Winston-Salem, NC (US); Tom Vlieger, Zaventem (BE)

(73) Assignee: Tekni-Plex, Inc., Wayne, PA (US)

( * ) Notice: Subject to any disclaimer, the term of this patent is extended or adjusted under 35 U.S.C. 154(b) by 127 days.

(21) Appl. No.: 18/507,329

(22) Filed: Nov. 13, 2023

(65) Prior Publication Data
US 2025/0153445 A1    May 15, 2025

(51) Int. Cl.
  *B29C 65/36*  (2006.01)
  *B29C 65/00*  (2006.01)
  (Continued)

(52) U.S. Cl.
  CPC .......... *B29C 65/362* (2013.01); *B29C 66/851* (2013.01); *B65D 41/02* (2013.01);
  (Continued)

(58) Field of Classification Search
  CPC .......... B65D 2565/385; B65D 77/2024; B65D 65/40; B65D 41/02; B29C 66/851; B29C 65/362
  See application file for complete search history.

(56) References Cited

U.S. PATENT DOCUMENTS

| | | |
|---|---|---|
| 4,380,484 A | 4/1983 | Repik et al. |
| 4,596,338 A | 6/1986 | Yousif |

(Continued)

FOREIGN PATENT DOCUMENTS

| | | |
|---|---|---|
| EP | 0488985 A1 | 11/1991 |
| EP | 2057081 B1 | 3/2013 |
| FR | 2693986 A1 | 1/1994 |

OTHER PUBLICATIONS

International Search Report and Written Opinion from the counterpart application issued on Feb. 10, 2025, Application No. PCT/US2024/050940.

*Primary Examiner* — Vishal I Patel
(74) *Attorney, Agent, or Firm* — POLSINELLI PC (57) ABSTRACT

A structure and method of forming a metal foil-less liner, such that the entire liner can be recycled in a respective paper or plastic recycling stream. A separate application device is provided, which includes a metal layer, that is used to induction heat seal the liner to the container rim. The application device is removable, allowing a plastic closure cap to be applied over the liner sealed container rim, to provide the final product for sale to the consumer, who then removes the cap and peels off or pierces through the liner to dispense the product through the open mouth of the container. The application device is also reusable, i.e., it can be used to attach a subsequent liner to another container rim. The result is a liner that is fully recyclable in a paper or plastic recycling stream. In one embodiment, the entire container package may be recyclable, namely the plastic container is recyclable in a plastic recycle stream, the plastic container cap is recyclable in a plastic recycle stream (same or different than the recycle stream for the container), and the entire liner is recyclable in a paper or plastic recycle stream (which may be the same as one or more of the recycle streams for the container and cap). The result is also a (Continued)

sustainable packaging solution where the application device that generates heat for induction heat sealing can also be re-used.

16 Claims, 8 Drawing Sheets

(51) Int. Cl.
*B65D 41/02* (2006.01)
*B65D 65/40* (2006.01)
*B65D 77/20* (2006.01)

(52) U.S. Cl.
CPC ......... *B65D 65/40* (2013.01); *B65D 77/2024* (2013.01); *B65D 2565/385* (2013.01)

(56) References Cited

U.S. PATENT DOCUMENTS

| | | | |
|---|---|---|---|
| 5,191,181 A * | 3/1993 | Regenscheid | B29C 66/53461 |
| | | | 53/306 |
| 5,381,913 A | 1/1995 | Mortsel | |
| 5,712,042 A | 1/1998 | Cain | |
| 6,050,055 A | 4/2000 | Calvert et al. | |
| 6,082,566 A | 7/2000 | Yousif et al. | |
| 2021/0214135 A1* | 7/2021 | Coates | B29C 66/131 |
| 2023/0226797 A1 | 7/2023 | Thorstensen-Woll | |

* cited by examiner

INDUCTION HEAT SEALABLE CLOSURE LINER CONFIGURED FOR PAPER OR PLASTIC RECYCLING STREAM, AND INDUCTION HEAT SEAL APPLICATION DEVICE

FIELD OF THE INVENTION

The present invention relates to an induction heat sealable closure liner that is configured to be fully recyclable in a paper or plastic recycling stream and is metal free.

BACKGROUND OF THE INVENTION

Liners or seals have been used on containers for many years to prevent leakage or contamination and to increase the shelf life of the substance or product held within the container. For example, liners are used on containers for cosmetics, foods, drinks, medicines and other items in the form of liquids, creams, gels, particulates, powders and other substances. Liners for this purpose are typically placed over the opening on the container or, in some instances, within a cap before placing the combined cap and liner over the opening (mouth) of the container.

It is common practice to attach the liner to the rim (surrounding the open mouth) of the container by the process of induction heat sealing. This requires that a metal foil layer be present in the liner structure to transfer heat to a lowermost heat seal layer for bonding the liner to the container rim. The bonding is temporary or permanent, allowing the customer (user) to either remove the liner by peeling it off the rim of the container or by piercing through the liner. The liner thus serves multiple purposes, including providing a tamper-proof seal, as well as preventing leakage, contamination, or spoilage of the product in the container.

Induction heat seal liners require a metal layer for heat transfer, and in prior liners this metal layer prevents recycling of the liner in a paper or plastic recycling stream. The heat seal layer, and the use of various types of plastic and wax layers in a mixed composite structure, also prevents recycling of the liner in a single recycling stream. As a result, the liners generate non-recyclable trash even if the cap and/or container can be recycled. Also, prior art liners may delaminate during the peeling step, leaving liner residue on the container, and/or the liner is configured to separate with one or more layers remaining in the cap for resealing, both further impeding recycling of these structures.

Thus it would be desirable to provide a fully recyclable induction heat sealable liner structure, suitable to recycling in a paper or plastic recycling stream, while also providing the desired characteristics of providing tamper evidence, barrier properties to resist spoilage of the product, leak resistance, and resisting delamination during removal from the container rim.

SUMMARY OF THE INVENTION

The present invention relates to a structure and method of forming a metal foil-less liner, such that the entire liner can be recycled in a respective paper or plastic recycling stream. For example, the liner may include a plastic (e.g., PET) support layer, and a heat seal layer of a composition and weight percentage that is compatible with a plastic (e.g., PET) recycling stream. In another example, the liner includes a paper (also referred to as pulp or paperboard) support layer, and a heat seal layer of a composition and weight percentage that is compatible with a paper recycling stream.

A separate application device is provided, which includes a metal layer, that is used to induction heat seal the liner to the container rim. The application device is positionable above the liner and rim, the device/liner/rim assembly is positioned under an induction heat sealing head, and the application device then transfers heat to the heat seal layer (on the bottom surface of the liner) in order to bond the liner to the rim. The application device is removable, allowing a plastic closure cap to be applied over the liner sealed container rim, to provide the final product for sale to the consumer, who then removes the cap and peels off the liner to dispense the product through the open mouth of the container. The application device is also reusable, i.e., it can be used to attach a subsequent liner to another container rim.

The result is a liner that is fully recyclable in a paper or plastic recycling stream. In one embodiment, the entire container package may be recyclable, namely the plastic container is recyclable in a plastic recycle stream, the plastic container cap is recyclable in a plastic recycle stream (same or different than the recycle stream for the container), and the entire liner is recyclable in a paper or plastic recycle stream (which may be the same as one or more of the recycle streams for the container and cap). The container can be metal or molded fiber/pulp recyclable in metal or paper recycle stream respectively. Similarly, the container cap can be molded fiber/pulp recyclable in paper stream.

The result is also a sustainable packaging solution where the application device that generates heat for induction heat sealing can also be re-used.

The removable and reusable induction heat seal application device can take various forms including: a plastic cap configured for temporary attachment to the liner/rim assembly, where the plastic cap includes a metal disk or metal ring that is positionable over the rim of the container. In another embodiment, the application device is a metal cap that includes both the structure for temporary attachment to the liner/rim assembly and for positioning over the rim of the container to transmit heat to the heat seal layer that lies above (in contact with) the rim.

In one embodiment, the foil-less liner can be temporarily attached (e.g., bonded) with the metal-based application device for ease of applying the combined device/liner over the container rim (prior to induction heat sealing). For example, where the application device includes a metal disk or ring that fits within a separate cap, both the disk (or ring) and the liner can be positioned within a retainer portion of the cap before applying the combined cap/metal disk or metal ring/liner on top of the rim of the container. In another embodiment, the device and liner can be separately applied over the rim (prior to induction heat sealing).

In one embodiment, the application device includes a cap having a top wall, an annular skirt depending down from the top wall, an inner closure area that includes a retainer portion (for receiving and holding the metal disk or metal ring and the liner positioned within the inner closure area of the cap), and an inner thread for temporarily attaching the inner thread of the cap to a complementary outer thread on the container neck (below the container rim) to hold the application device and liner securely in position over the rim for the induction heat seal bonding step.

In one embodiment, an apparatus for induction heat sealing a liner to a rim of a container comprising:
an induction heat sealable foil-less and fully recyclable liner (10) made of plastic or paper recyclable in a respective plastic or paper recycle stream and a heat seal layer that is also recyclable in the respective plastic or paper recycle stream;

a removable and reusable induction heat seal application device (110) comprising a metal disk (130D), a metal ring (130R) or a metal cap (120M), wherein the reusable application device (110) is configured for positioning above the liner (10) and a container rim (22L) while induction heat sealing the liner to the rim, and the device (110) is thereafter removable from the liner-sealed rim to allow a container cap (40) to be applied over the liner and rim, thus providing a fully recyclable liner (10) that is recyclable in a respective plastic or paper recycle stream.

In one embodiment, the container cap (40) is recyclable in a plastic recycle stream thus providing a fully recyclable cap and liner assembly.

In one embodiment, the container (20) is recyclable in a plastic recycle stream thus providing a fully recyclable liner and container assembly.

In one other embodiment, the cap (40), liner (10) and container (20) are each recyclable in a plastic recycle stream thus providing a fully recyclable cap, liner and container assembly.

In one embodiment, the container (20) and cap (40) are each recyclable in a plastic, glass, paper or metal recycle stream thus providing a fully recyclable cap, liner and container assembly.

In one embodiment, the liner comprises:
  a paperboard layer (105) in a thickness range of 2 to 27 mils, and/or a paperboard layer in a range of 25 lbs/ream to 350 lbs/ream, where a ream comprises 3,000 square feet; and
  a heat seal layer (106) in a thickness range of 0.15 to 3.5 mils, and/or a heat seal layer in a range of 2 lbs/ream to 50 lbs/ream, where a ream comprises 3,000 square feet.

In one embodiment, the liner comprises:
  a plastic layer (105) in a thickness range of 0.5 to 15 mils, and/or a plastic layer in a range of 25 lbs/ream to 225 lbs/ream, where a ream comprises of 3,000 square feet; and
  a heat seal layer (106) in a thickness range of 0.15 to 3.5 mils, and/or a heat seal layer in a range of 2 lbs/ream to 50 lbs/ream, where a ream comprises of 3,000 square feet.

In one embodiment, the reusable application device comprises the metal disk (130D) positioned in a cap (120P) configured to be secured over the liner and rim.

In one embodiment, the reusable application device comprises the metal ring (130R) positioned in a cap (120P) configured to be secured over the liner and rim.

In one embodiment, the reusable application device comprises the metal cap (120M) configured to be secured over the liner and rim.

In another embodiment, a method of induction heat sealing a liner to a rim of a container comprising:
  providing a liner (10) made of plastic or paper recyclable in a respective plastic or paper recycle stream and a heat seal layer that is also recyclable in the respective plastic or paper recycle stream;
  positioning a removable and reusable induction heat seal application device (110) and the liner (10) above the rim (22L) of a container (20) to form a device/liner/rim assembly (110/10/22L);
  positioning an induction heat sealing head (8) above the device/liner/rim assembly (110/10/22L) and activating the sealing head (8) to inductively heat seal the liner (10) to the rim (22L);
  removing the sealing head (18) and device (110) from the liner-sealed rim;
  applying a container cap (40) over the liner-sealed rim;
  reusing the device (110) for subsequent induction heat sealing of a liner to a container rim; and
  recycling the liner, or the liner and one or more of the container cap (40) and the container (20) in the respective paper or plastic recycle stream(s).

In another embodiment, the removable and reusable induction heat seal application device (110) comprises a metal ring positioned in a cap for securing the device to the liner and rim.

In another embodiment, the removable and reusable induction heat seal application device (110) comprises a metal disk positioned in a cap for securing the device to the liner and rim.

In another embodiment, the removable and reusable induction heat seal application device (110) comprises a metal cap for securing the device to the liner and rim.

BRIEF DESCRIPTION OF THE DRAWINGS

There is shown in the drawings one or more exemplary embodiments, it being understood however, that the invention is not limited to the specific articles and methods disclosed. Additionally, like reference numerals represent like items throughout the drawings.

FIGS. 8A-8C show three embodiments of a removable and reusable induction heat seal application device that can be temporarily secured over the liner and container rim during induction heat sealing according to the invention; in FIG. 8A, the application device includes a cap (e.g., plastic) that receives a metal ring within an inner closure area of the cap, wherein the metal ring transfers heat to the heat seal layer that lies over the container rim; in FIG. 8B, the application device includes a cap (e.g., plastic) that receives a metal disk within an inner closure area of the cap, wherein the metal disk transfers heat to the heat seal layer that lies over the container rim; in FIG. 8C the application device is a metal cap that transfers heat to the heat seal layer that lies over the container rim;

DETAILED DESCRIPTION

Overview

Various embodiments of the invention will now be described with references to the figures.

The present invention relates to a structure and method of forming a metal foil-less liner, such that the entire liner can be recycled in a respective paper or plastic recycling stream. For example, the liner may include a plastic (e.g., PET) support layer, and a heat seal layer of a composition and weight percentage that is compatible with a plastic (e.g., PET) recycling stream. In another example, the liner includes a paper (also referred to as pulp or paperboard) support layer, and a heat seal layer of a composition and weight percentage that is compatible with a paper recycling stream.

A separate application device is provided, which includes a metal layer, that is used to induction heat seal the liner to the container rim. The application device is positionable above the liner and rim, the device/liner/rim assembly is positioned under an induction heat sealing head, and the application device then transfers heat to the heat seal layer (on the bottom surface of the liner) in order to bond the liner to the rim. The application device is removable, allowing a plastic closure cap to be applied over the liner sealed container rim, to provide the final product for sale to the consumer, who then removes the cap and peels off or pierces through the liner to dispense the product through the open mouth of the container. The application device is also reusable, i.e., it can be used to attach a subsequent liner to another container rim.

The result is a liner that is fully recyclable in a paper or plastic recycling stream. In one embodiment, the entire container package may be recyclable, namely the plastic container is recyclable in a plastic recycle stream, the plastic container cap is recyclable in a plastic recycle stream (same or different than the recycle stream for the container), and the entire liner is recyclable in a paper or plastic recycle stream (which may be the same as one or more of the recycle streams for the container and cap).

The result is also a sustainable packaging solution where the application device that generates heat for induction heat sealing can also be re-used.

REFERENCE NUMBERS AND PARTS

The following reference numbers are used to designate the indicated parts in the accompanying figures:
Ref. No./Description
4 Product (substance) in the container
7 Sheet of liners
8 Induction heat sealing head
20 Plastic Container—recyclable
  21 Container body
  22 Container mouth 22 surrounded by a rim 22L
  23 Internal chamber
  24 Shoulder
  25 TSS (top sealing surface) on rim 22L of container
  26 Outer screw thread
  27 Neck
40 Plastic Container Cap—recyclable
  41 Top wall
  42 Annular skirt
  43 Inner closure area
  44 Retainer portion
  45 Inner surface
  46 Inner screw thread
50 Method of FIG. 1, steps 51-57
60 Method of FIG. 2, steps 61-69
70 Method of FIG. 3, steps 71-77
100 Recyclable Foil—Less Liner
  100c Liner circumference, diameter D
  100t Liner thickness, transverse direction T
  101 Top planar surface
  103 Bottom planar surface
  104 Tabs
  105 Paper or plastic support layer(s)
  106 Heat seal layer
110 Removable and Recyclable Inductive Heat Seal Application Device
  120 Application Device Cap: metal cap 120M; plastic cap 120P
  121 Top wall
  122 Annular shirt
  123 Inner closure area (similar to 43) not shown
  124 Retainer portion (similar to 44) not shown
  125 Inner surface (similar to 45) not shown
  126 Inner thread (similar to 46) not shown
  130 Metal disk 130D or metal ring 130R
  135 Aperture in metal ring 130R
  136 Upper and lower surfaces 136U, 136L Method/Structural Embodiments of FIGS. 1-3

Figure 1:
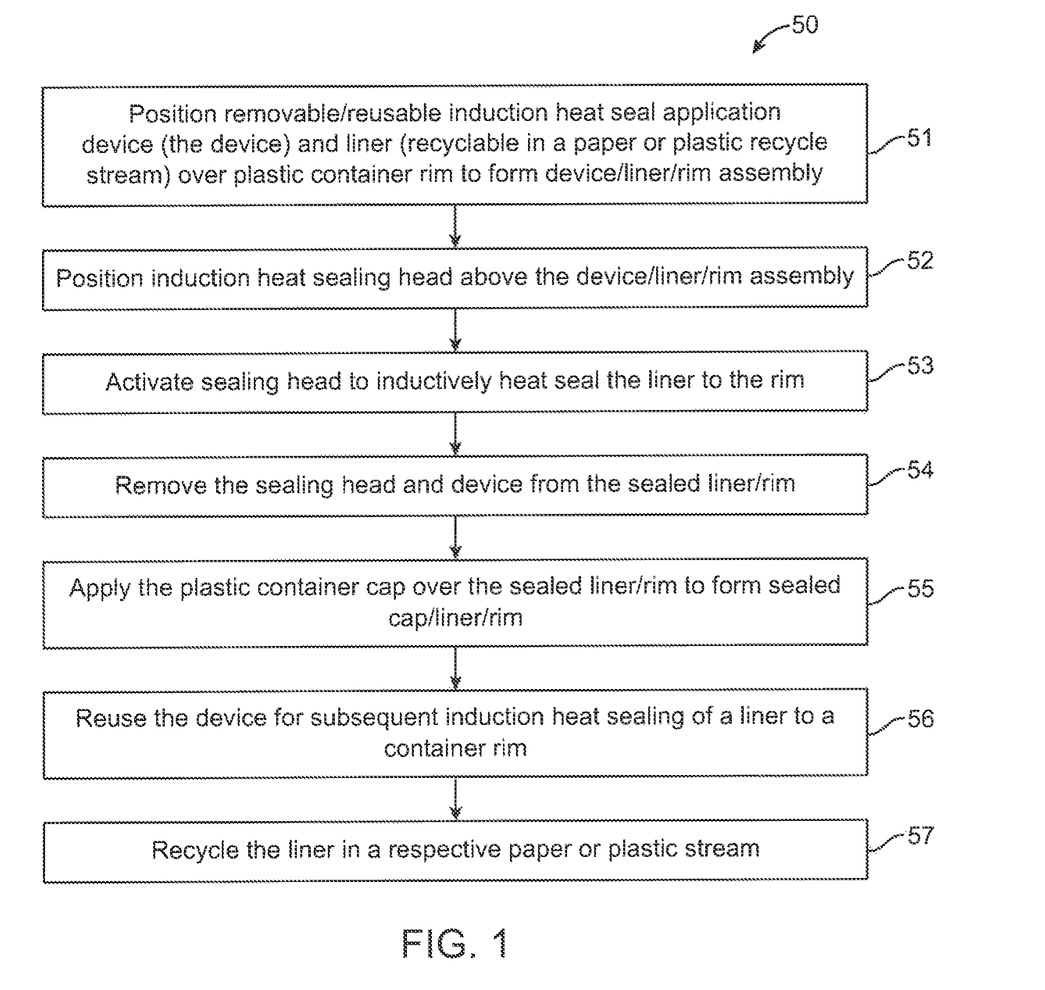
FIG. 1 is a first method and structural embodiment of the invention.
Figure 2:
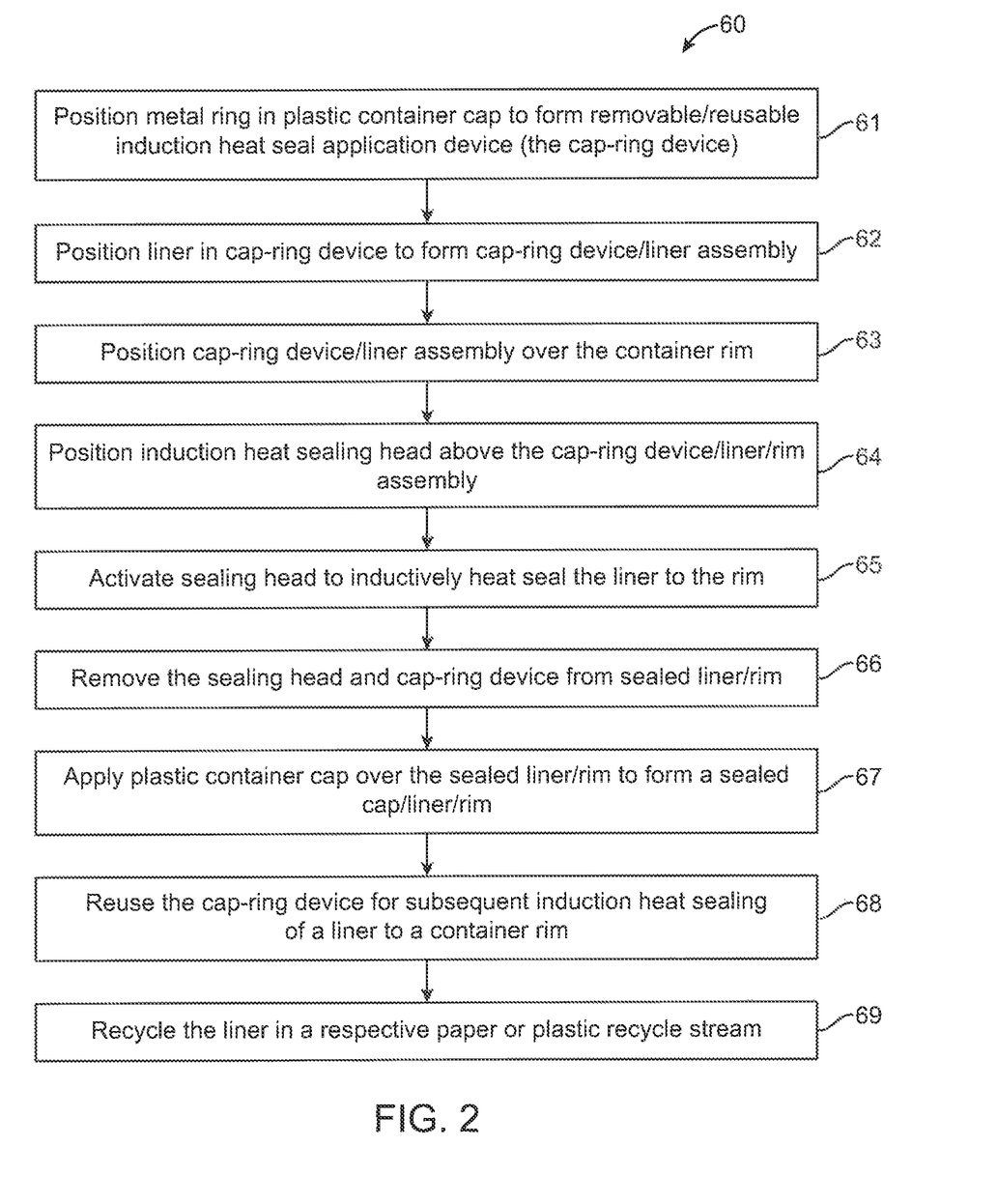
FIG. 2 is a second method and structural embodiment of the invention.
Figure 3:
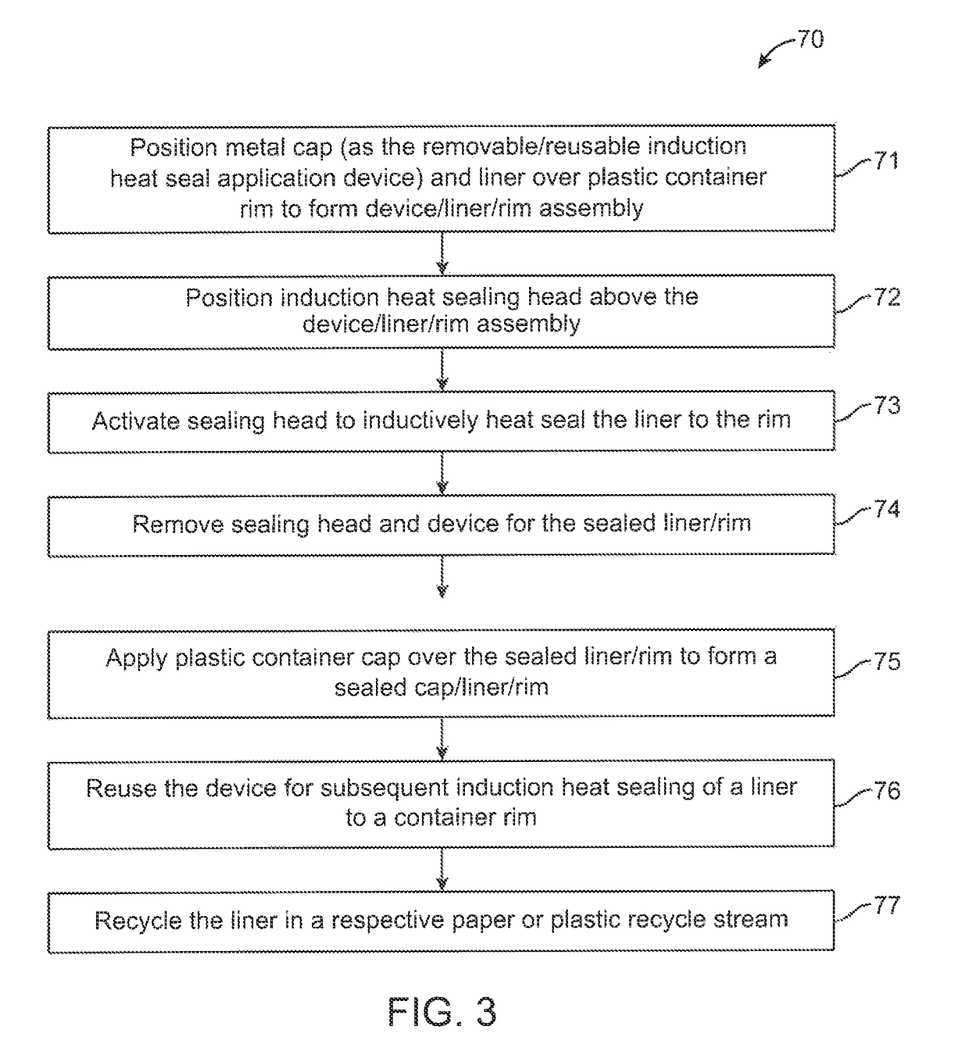
FIG. 3 is a third method and structural embodiment of the invention.

FIGS. 1-3 illustrate three method/structural embodiments of the invention.

In the method (50) of FIG. 1, the steps include:
position removable/reusable induction heat seal application device (the device) and liner (recyclable in a paper or plastic recycle stream) over plastic container rim to form device/liner/rim assembly (51);
position induction heat sealing head above the device/liner/rim assembly (52);
activate sealing head to inductively heat seal the liner to the rim (53);
remove the sealing head and device from the sealed liner/rim (54);
apply the plastic container cap over the sealed liner/rim to form sealed cap/liner/rim (55);
reuse the device for subsequent induction heat sealing of a liner to a container rim (56); and
recycle the liner or complete package in a respective paper or plastic stream (57).

In the method (60) of FIG. 2, the steps include:
position metal ring in plastic container cap to form removable/reusable induction heat seal application device (the cap-ring device) (61);

position liner in cap-ring device to form cap-ring device/
   liner assembly (62);
position cap-ring device/liner assembly over the container
   rim (63);
position induction heat sealing head above the cap-ring
   device/liner/rim assembly (64);
activate sealing head to inductively heat seal the liner to
   the rim (65);
remove the sealing head and cap-ring device from sealed
   liner/rim (66);
apply plastic container cap over the sealed liner/rim to
   form a sealed cap/liner/rim (67);
reuse the cap-ring device for subsequent induction heat
   sealing of a liner to a container rim (68); and
recycle the liner or complete package in a respective
   paper or plastic recycle stream (69).
In the method (70) of FIG. 3, the steps include:
position metal cap (as the removable/reusable induction
   heat seal application device) and liner over plastic
   container rim to form device/liner/rim assembly (71);
position induction heat sealing head above the device/
   liner/rim assembly (72);
activate sealing head to inductively heat seal the liner to
   the rim (73);
remove sealing head and device for the sealed liner/rim
   (74);
apply plastic container cap over the sealed liner/rim to
   form a sealed cap/liner/rim (75);
reuse the device for subsequent induction heat sealing of
   a liner to a container rim (76); and
recycle the liner or complete package in a respective
   paper or plastic recycle stream (77).

Closure Cap, Liner and Container Assembly

Figure 4:
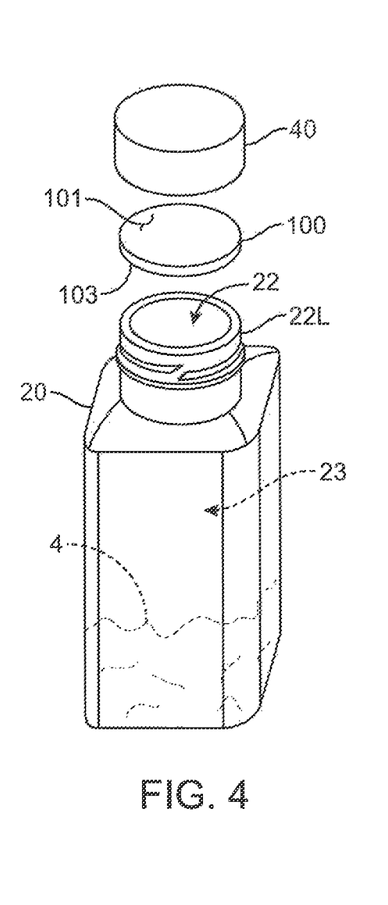
FIG. 4 is a front perspective view of an induction heat sealable foil-less and fully recyclable liner, positioned between a rim of a container and a removable container cap, in accordance with one embodiment of the invention.
Figure 5:
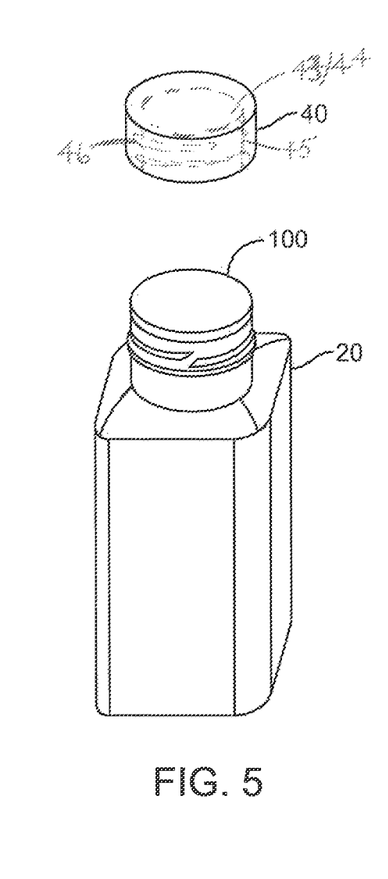
FIG. 5 is a front perspective view similar to FIG. 1, showing the liner now attached (induction heat sealed) to the rim of the container.
Figure 6:
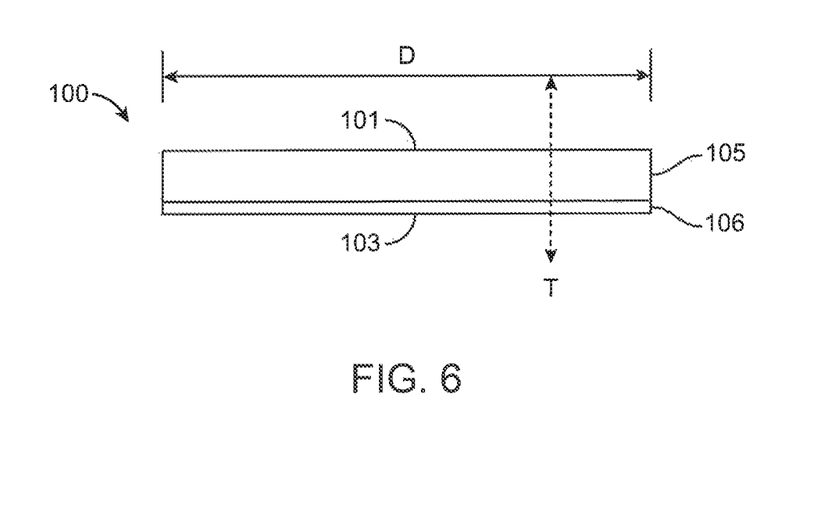
FIG. 6 is a cross-sectional schematic view of the foil-less and fully recyclable liner of FIGS. 4-5, now showing a paper or plastic support layer above a lowermost heat seal layer.

Referring to FIGS. 4-6, there is shown an induction heat seal foil-less liner 100 that is fully recyclable in a paper or plastic recycling stream in accordance with one embodiment of the present invention. The liner is configured to be sealed to a rim 22L surrounding an open mouth 22 of a container, wherein the mouth (when unsealed) provides access to an internal chamber 23 of the container holding a product or substance 4. A removable closure cap 40 (here a threaded cap) is then applied over the liner-sealed opening of the container. The consumer first removes (unscrews) the cap 40, and then peels off or pierces through the liner 100 to gain access to the product 4 in the body 21 of the container.

The liner 100 may be used on a variety of containers (plastic or glass) for holding various food, cosmetic, confectionery, household and other products in the form of liquid, solid or paste (semi-solid) substances 4.

The liner 100 may be of various dimensions and shapes; here for example the liner is circular having a diameter D and a thickness 100t (in a direction transverse T to the diameter). The liner is of unitary construction as shown in FIG. 6, having opposing top and bottom planar surfaces 101, 103 respectively, and including a top support layer 105 of recyclable paper or plastic, and a bottom heat seal layer 106 also recyclable in the respective paper or plastic recycle stream as the top layer 105. It should be noted that more or fewer layers, or layers of other materials than listed herein may be used without departing from the present invention, as long as the total liner structure satisfies one of the respective paper or plastic recycling stream requirements. For example, adhesives or other bonding materials may be provided between the layers. Alternatively, one or more layers may include printed information or designs, e.g., in the form of a varnish or coating with inks or dyes. In one embodiment, a printed or informational layer is provided on the outermost top surface 101 of the liner, above the support layer 105 and facing the consumer when the closure is removed from the sealed container.

The container 20 is filled with a product 4 through the opening 22 (or through another orifice of the container that communicates with the chamber 23) and a liner 100 is sealed to the TSS 25 on the rim around the opening 22, allowing the customer (after sale) to remove the cap 40 and peel off the liner 100 to access the product. The liner 100 can be used with different types of containers 20 and different types of closures or caps 40, such as a threaded cap (FIGS. 1-2), a snap-closed or flip-top cap, or other types of caps known in the industry. In the embodiment of FIGS. 4-6, the liner 100 is heat seal bonded at its lower-most (bottom) surface 103 to an annular (circumferential) rim or lip 22L of the container 20 surrounding the opening 22, and the cap 40 is closed (threaded) thereover (engaging an outer thread 26 on the neck 27 of the container 20).

In one embodiment, the paper or plastic support layer thickness 105t and/or heat seal layer thickness 106t of the liner eliminates any need for a further barrier layer, membrane or material to be laminated to the liner, while preventing access, leakage, and contamination through the liner.

In the present embodiment, the liner 100 is a generally disc-shaped (circular) article having a diameter D, with parallel and opposing top 101 and bottom 103 planar faces each with a matching circular circumference 100c, and a transverse liner thickness 100t which is relatively thin compared to the diameter D (note in FIG. 6 the liner thickness and diameter are not shown to scale, as the liner thickness 100t would more typically be on the order of 0.3% of the liner diameter D). In one embodiment, the total liner thickness 100t is in a range of 2.5-30 mils. A mil is a unit of length equal to one thousandth of an inch (0.0254 millimeter).

Figure 7:
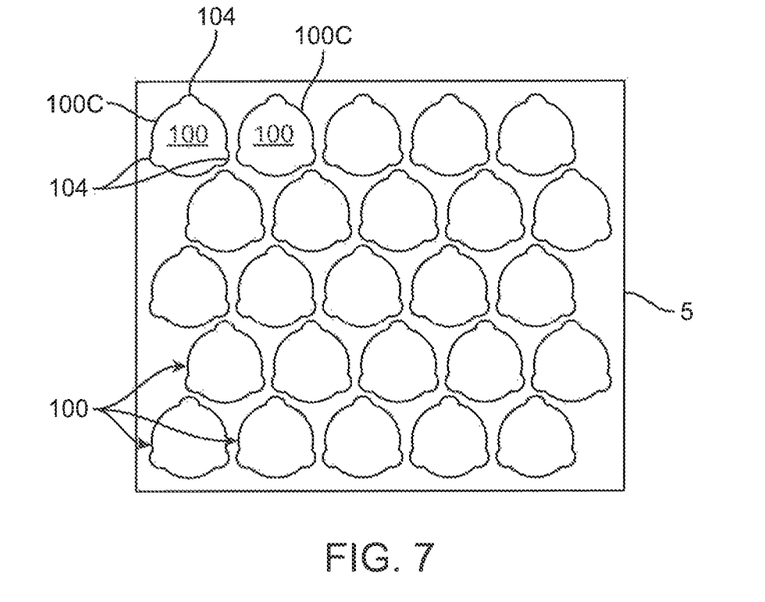
FIG. 7 is a top plan view of a liner sheet or web including multiple liners in accordance with one embodiment of the invention.

In another embodiment, the liner 100 includes one or more tabs 104 around the circumferential edge 100c to assist in peeling the liner off the rim (see FIG. 7 showing a sheet 5 with multiple tabbed liners 100). This is not meant to be limiting, as no tabs and/or other shapes of liner may be used. For example, an oval or rectangular liner may be provided to seal an oblong or rectangular opening or mouth, without departing from the present invention.

The liner 100 is affixed by a heat seal bond (via bottom heat seal layer 106) to an area (here annular lip or rim 22L) around the opening 22 of the container 20, thus completely covering and sealing around the opening. The liner can then later be peeled off or pierced through (by the ultimate purchaser/consumer) to access the contents 4 of the container. Typically, the liner 100 can be peeled off using a fingernail or, in embodiments having a tab 104, by grasping the tab between the thumb and forefinger to facilitate removal of the liner 100 from the opening 22 of the container 20.

In some embodiments the heat seal bond layer 106 may be limited to a perimeter area of the liner, as this is all that is required for sealing around the rim 22L of the container. In other embodiments, the heat seal layer may cover additional surface areas and/or the entire lowermost surface 103 of the liner.

In one embodiment, the thicknesses in the transverse direction T of the support layer 105 and/or of the heat seal layer 106 do not permit venting (the release of gas from within the container to the exterior) to occur through the liner 100. Thus, the liner 100 is a non-venting liner. More particularly, the support and heat seal layers of the liner 100 do not permit a free flow of air or gas from inside the container 20 to the outside of the container 20, or vice versa.

The container 20 may be composed of any materials capable of providing a tamper evident, removable induction heat seal secured to the container and that are suitable to package the product being sold. It may also provide barrier properties as desired. The container 20 may be composed of a polymer material, for example of polyethylene PE, polypropylene PP, polyethylene terephthalate PET, or polyvinyl chloride PVC. In another embodiment, the container 20 is glass. Once the liner 100 has been secured over the opening 22 of the container 20, a removable cap 40 is secured to the container 20 over the liner 100.

The barrier properties of the liner 100, measured e.g., in terms of oxygen transmission rates (OTR) or moisture vapor transmission rates (MVTR)) can be controlled by adjusting (reducing or increasing) the materials and dimensions of the various layers in the liner 100. In the present embodiment, the required barrier properties of the sealed container are maintained by the support layer 105 and heat seal layer 106.

Referring now to FIG. 7, there is shown a web or sheet of bulk liner material 5 from which a plurality of individual liners 100 are cut or punched. Web 5 is assembled as a one-piece, multi-layer sheet prior to punching the liners 100 from the web sheet. The web 5 is made from a plurality of individual sheets stacked one atop the other in the T direction to form an integral liner sheet material 5. The heat seal layer 106 can be a solvent or water based lacquer type coating, resin based single or co-extruded or slot die applied resin coating or a film based heat sealant film that is on the lowermost surface of the support layer 105. Alternately, if desired, liners can be made from strips of multi-layered materials, mounted on reels that are fed through a punching machine to die cut or punch the seal.

In one embodiment, the support layer 105 is a paperboard layer comprising a sheet of cellulose material, including those materials typically used in the liner industry and referred to as paper, paperboard, board and pulp. The sheet may comprise wood fiber or other cellulose fibers, and may further include fillers, binders, chemical treatment and surface coatings, and may be made of virgin or recycled materials.

The paperboard layer 105 may be a sheet comprising a heterogeneous mixture of plant material such as cellulose, hemi-cellulose, lignin, etc. and filling material such as china clay, calcium carbonate, etc., chemical additives such as rosin, alum, starch, etc. depending on the grade of the paper. Typically, the paperboard layer is comprised of >80% cellulosic fiber, together with one or more binders, optical brighteners, coatings and/or other chemicals.

In various embodiments, the thicknesses of the respective layers may comprise:

a paperboard layer 105 in a thickness range of 2 to 27 mils, and/or a paperboard layer in a range of 25 lbs/ream to 350 lbs/ream, where a ream comprises 3,000 square feet;

a heat seal layer 106 in a thickness range of 0.15 to 3.5 mils. (0.00015 to 0.0035 inch), and/or a heat seal layer in a range of 2 lbs/ream to 50 lbs/ream, where a ream comprises 3,000 square feet.

Alternatively, the thicknesses of the respective layers may comprise:

a plastic layer 105 in a thickness range of 0.5 to 15 mils, and/or a plastic layer in a range of 25 lbs/ream to 225 lbs/ream, where a ream comprises of 3,000 square feet;

a heat seal layer 106 in a thickness range of 0.15 to 3.5 mils. (0.00015 to 0.0035 inch), and/or a heat seal layer in a range of 2 lbs/ream to 50 lbs/ream, where a ream comprises of 3,000 square feet.

The liner of the present invention provides a simple, cost-effective solution that will allow consumers to recycle the entire liner 100 in a paper or plastic recycling stream. As a result, manufacturers currently selling products without liners will now be able to include liners on their containers and provide a totally recyclable container package, including the container, cap and liner (each recyclable in a respective plastic or paper recycling stream), while providing the benefits that liners provide, including maintaining product integrity and barrier properties, extending shelf life, providing tamper evidence, preventing leakage, preventing products from being contaminated and/or damaged by consumers sampling the products, and/or otherwise creating an unsaleable product due to leakage, contamination or damage.

Removable Reusable Induction Heat Seal Application Device

FIGS. 8-12 illustrate various embodiments of the removable and reusable induction heat seal application device 110 according to various embodiments.

Figure 8A:
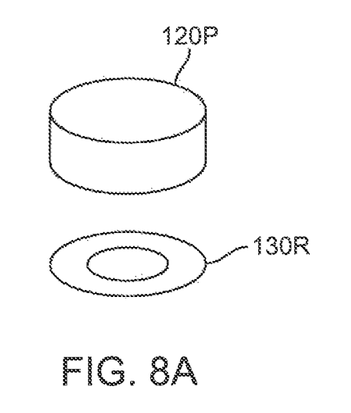
Figure 8B:
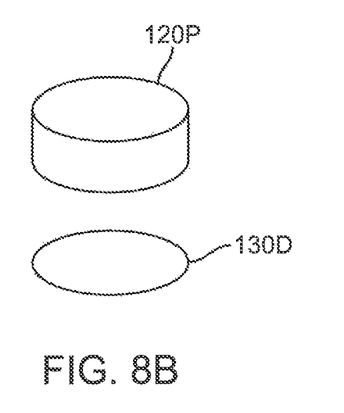
Figure 8C:
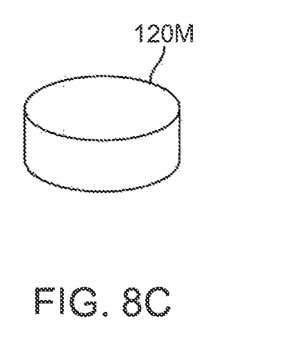

FIGS. 8A-8C show three embodiments of a removable and reusable induction heat seal application device 110 that can be temporarily secured over the liner 100 and rim 22L during induction heat sealing according to the invention. In FIG. 8A, the application device includes an application cap 120P (e.g., plastic) that receives a metal ring 130R within an inner closure area 123 of the application cap, wherein the metal ring transfers heat to the heat seal coating 106 over the container rim 22L. In FIG. 8B, the application device includes a cap 120P (e.g., plastic) that receives a metal disk 130D within an inner closure area 123 of the application cap, wherein the metal disk transfers heat to the heat seal layer 106 that lies over the container rim 22L. In FIG. 8C, the application device is a metal cap 120M that transfers heat to the heat seal layer 106 that lies over the container rim 22L.

Figure 9A:
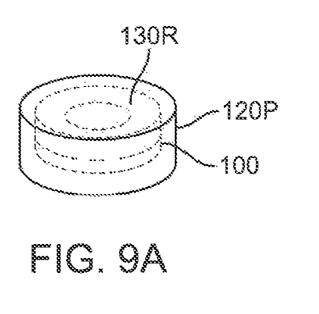
FIGS. 9A and 9B are similar to FIGS. 8A and 8B respectively, now showing the metal ring (or metal disk) and liner positioned within an inner closure area of the application cap for securing the application device above the liner/rim during induction heat sealing.
Figure 9B:
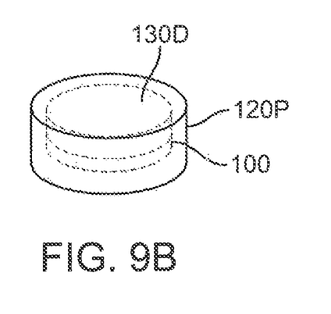

FIGS. 9A and 9B are similar to FIGS. 8A and 8B respectively, now showing the metal ring 130R (or metal disk 130D) and liner 100 positioned within an inner closure area 123 of the application cap for securing the application device above the liner/rim during induction heat sealing.

Figure 10:
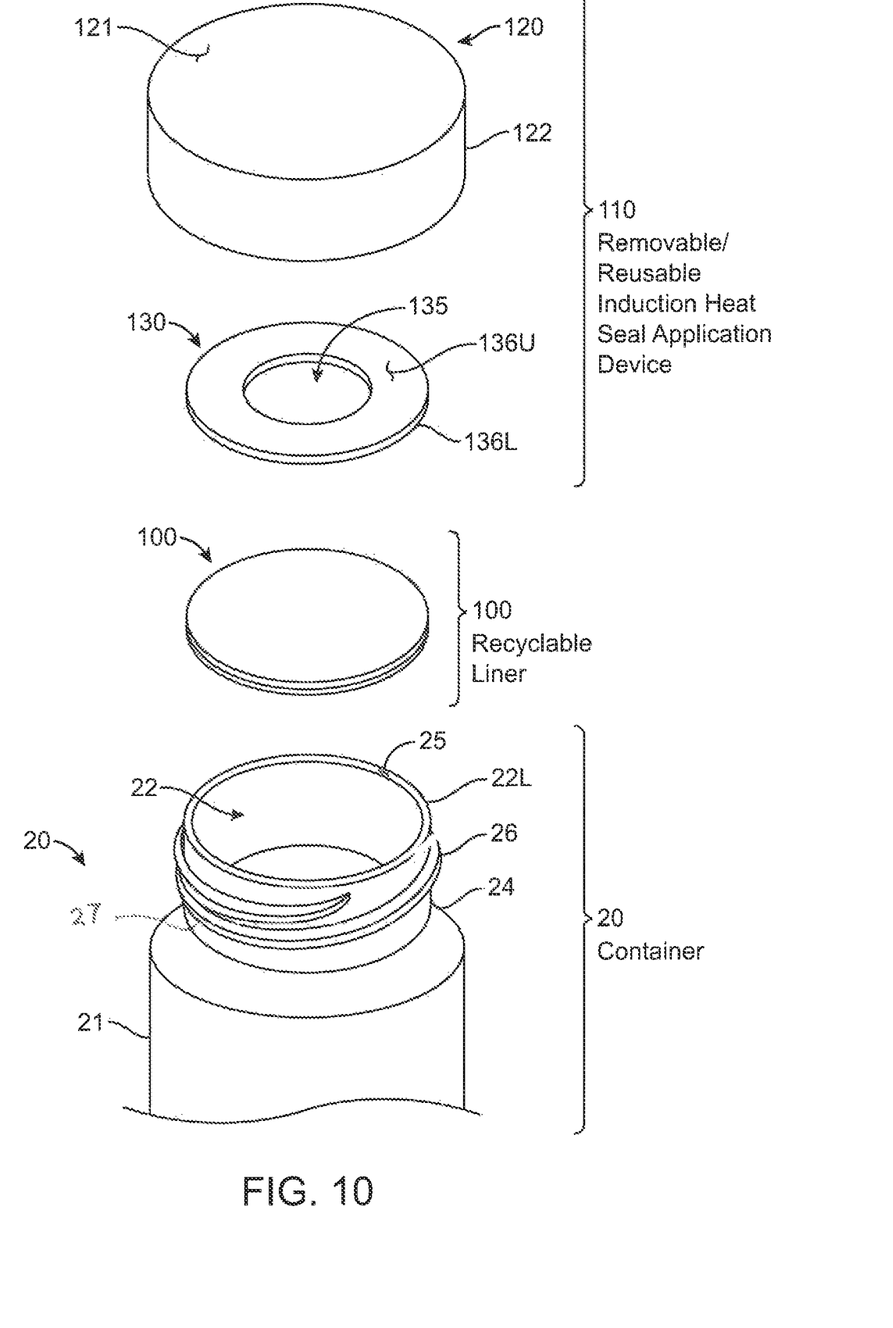
FIG. 10 is an exploded perspective view of the FIGS. 8A/9A embodiment showing the removable/reusable induction heat seal device (comprising a plastic application cap and a metal ring), the recyclable liner, and the container (prior to assembly)

FIG. 10 is an exploded perspective view of the FIGS. 8A/9A embodiment showing the removable/reusable induction heat seal application device 110 comprising a plastic applicator cap 120P and a metal ring 130R, the recyclable liner 100, and the container 20 (prior to assembly).

Figure 11:
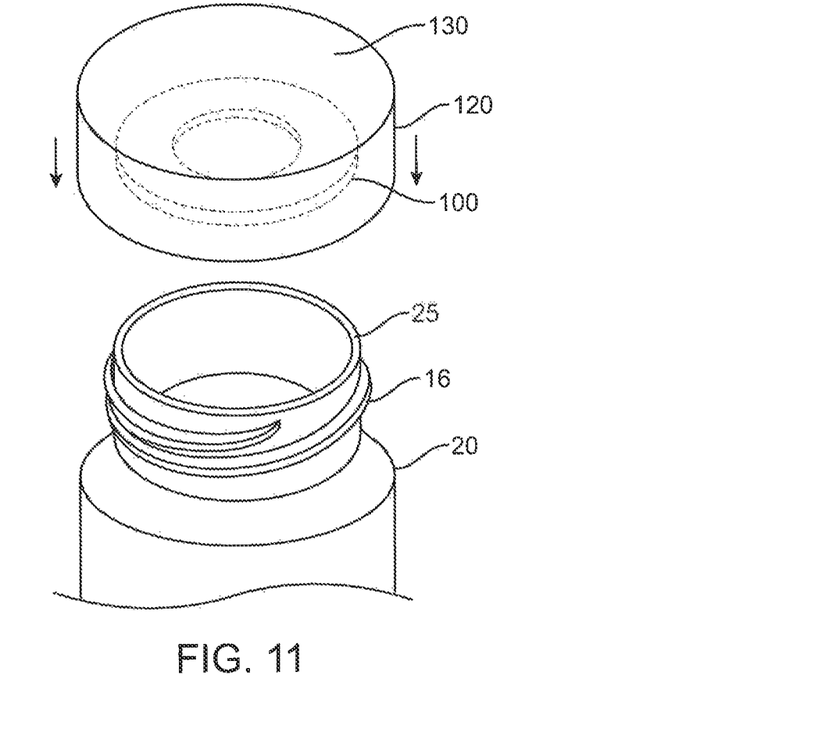
FIG. 11 is an exploded view of the FIG. 10 embodiment, after the metal ring and liner have been inserted into the inner closure area of the application cap, and before being screwed downwardly on the threaded neck of the container.

FIG. 11 is an exploded view of the FIG. 10 embodiment, after the metal ring 130R and liner 100 have been inserted into the inner closure area 123 of the application cap 120P, and before being screwed downwardly on the threaded neck 27 of the container 20.

Figure 12:
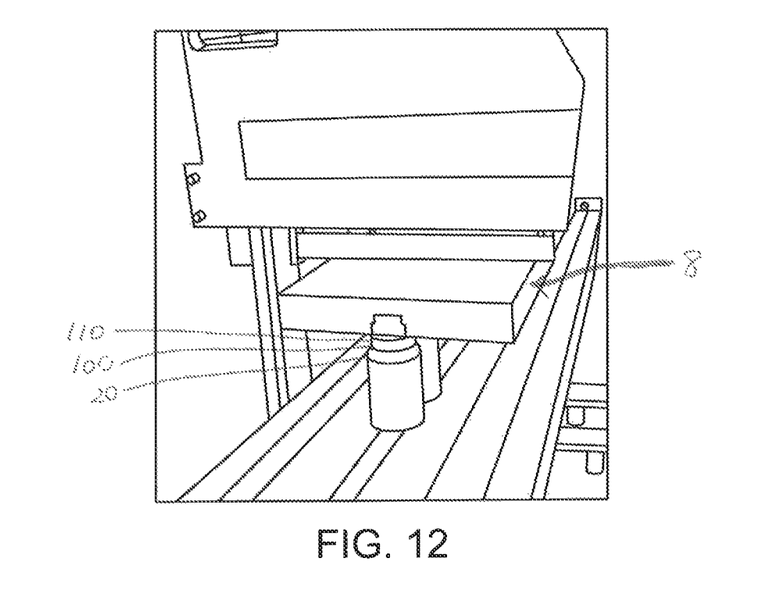
FIG. 12 is a perspective view of a manufacturing line of application device/liner/container assemblies being moved (in serial order) under an induction heat sealing head for securing the liners to the rims of the respective containers.

FIG. 12 is a perspective view of a manufacturing line of application device/liner/container 110/100/20 assemblies being moved (in seral order) under an induction heat sealing head 8 for securing the liner 100 to the rims 22L of the respective containers 20.

In accordance with the invention, a separate application device (110) is provided, which includes a metal portion or layer (a metal ring 130R, or metal disk 130D, or a metal cap 120M), that is used to induction heat seal the liner to the container rim. The application device (110) is positionable over the liner (100) and rim (22L), and the device/liner/rim assembly is positioned under an induction heat sealing head 8 (as shown in FIG. 12), and the application device (110) then transfers heat to the heat seal layer (106) (on the bottom surface 103 of the liner 100) in order to bond the liner 100 to the rim 22L. The application device 110 is removable, allowing a plastic closure cap (40) to be subsequently applied over the liner sealed container rim, to provide the final product for sale to the consumer. The customer then removes the closure cap 40, and peels off or pierces through the liner to dispense the product through the open mouth 22 of the container 20. The application device 110 is also reusable, i.e., it can be used to attach a subsequent liner to another container rim.

The result is a liner that is fully recyclable in a paper or plastic based recycling stream. In one embodiment, the entire container package may be recyclable, namely the plastic container is recyclable in a plastic recycle stream, the plastic container cap is recyclable in a plastic recycle stream (same or different than the recycle stream for the container), and the entire liner is recyclable in a paper or plastic recycle stream (which may be the same as one or more of the recycle streams for the container and cap).

The result is also a sustainable packaging solution where the application device that generates heat for induction heat sealing can also be re-used.

While the invention has been described and illustrated in various terms and embodiments, the scope of the invention is not intended limited thereby and other modifications or embodiments as may be suggested by the teachings herein are particularly reserved as they fall within the scope of the appended claims.

The invention claimed is:

1. An apparatus for induction heat sealing a liner to a rim of a container comprising:
   an induction heat sealable foil-less and fully recyclable liner (10) made of plastic or paper recyclable in a respective plastic or paper recycle stream and a heat seal layer that is also recyclable in the respective plastic or paper recycle stream;
   wherein the liner comprises:
      a paperboard layer (105) in a thickness range of 2 to 27 mils, and/or a paperboard layer in a range of 25 lbs/ream to 350 lbs/ream, where a ream comprises 3,000 square feet; and
      a heat seal layer (106) in a thickness range of 0.15 to 3.5 mils, and/or a heat seal layer in a range of 2 lbs/ream to 50 lbs/ream, where a ream comprises 3,000 square feet;
   a removable and reusable induction heat seal application device (110) comprising a metal disk (130D), a metal ring (130R) or a metal cap (120M),
   wherein the reusable application device (110) is configured for positioning above the liner (10) and a container rim (22L) while induction heat sealing the liner to the rim, and the device (110) is thereafter removable from the liner-sealed rim to allow a container cap (40) to be applied over the liner and rim, thus providing a fully recyclable liner (10) that is recyclable in a respective plastic or paper recycle stream.

2. The apparatus of claim 1, wherein the container cap (40) is recyclable in a plastic recycle stream thus providing a fully recyclable cap and liner assembly.

3. The apparatus of claim 1, wherein the container (20) is recyclable in a plastic recycle stream thus providing a fully recyclable liner and container assembly.

4. The apparatus of claim 1, wherein the cap (40), liner (10) and container (20) are each recyclable in a plastic recycle stream thus providing a fully recyclable cap, liner and container assembly.

5. The apparatus of claim 1, wherein the container (20) and cap (40) are each recyclable in a plastic, glass, paper or metal recycle stream thus providing a fully recyclable cap, liner and container assembly.

6. An apparatus for induction heat sealing a liner to a rim of a container comprising:
   an induction heat sealable foil-less and fully recyclable liner (10) made of plastic or paper recyclable in a respective plastic or paper recycle stream and a heat seal layer that is also recyclable in the respective plastic or paper recycle stream;
   a removable and reusable induction heat seal application device (110) comprising a metal disk (130D), a metal ring (130R) or a metal cap (120M),
   wherein the reusable application device (110) is configured for positioning above the liner (10) and a container rim (22L) while induction heat sealing the liner to the rim, and the device (110) is thereafter removable from the liner-sealed rim to allow a container cap (40) to be applied over the liner and rim, thus providing a fully recyclable liner (10) that is recyclable in a respective plastic or paper recycle stream,
   wherein the liner comprises:
   a plastic layer (105) in a thickness range of 0.5 to 15 mils, and/or a plastic layer in a range of 25 lbs/ream to 225 lbs/ream, where a ream comprises of 3,000 square feet; and
   a heat seal layer (106) in a thickness range of 0.15 to 3.5 mils, and/or a heat seal layer in a range of 2 lbs/ream to 50 lbs/ream, where a ream comprises of 3,000 square feet.

7. An apparatus for induction heat sealing a liner to a rim of a container comprising:
   an induction heat sealable foil-less and fully recyclable liner (10) made of plastic or paper recyclable in a respective plastic or paper recycle stream and a heat seal layer that is also recyclable in the respective plastic or paper recycle stream;
   a removable and reusable induction heat seal application device (110) comprising a metal disk (130D), a metal ring (130R) or a metal cap (120M),
   wherein the reusable application device (110) is configured for positioning above the liner (10) and a container rim (22L) while induction heat sealing the liner to the rim, and the device (110) is thereafter removable from the liner-sealed rim to allow a container cap (40) to be applied over the liner and rim, thus providing a fully recyclable liner (10) that is recyclable in a respective plastic or paper recycle stream,
   wherein the reusable application device comprises the metal disk (130D) positioned in a cap (120P) configured to be secured over the liner and rim.

8. An apparatus for induction heat sealing a liner to a rim of a container comprising:
   an induction heat sealable foil-less and fully recyclable liner (10) made of plastic or paper recyclable in a respective plastic or paper recycle stream and a heat seal layer that is also recyclable in the respective plastic or paper recycle stream;
   a removable and reusable induction heat seal application device (110) comprising a metal disk (130D), a metal ring (130R) or a metal cap (120M),
   wherein the reusable application device (110) is configured for positioning above the liner (10) and a container rim (22L) while induction heat sealing the liner to the rim, and the device (110) is thereafter removable from the liner-sealed rim to allow a container cap (40) to be applied over the liner and rim, thus providing a fully recyclable liner (10) that is recyclable in a respective plastic or paper recycle stream,
wherein the reusable application device comprises the metal cap (120M) configured to be secured over the liner and rim.

9. A method of induction heat sealing a liner to a rim of a container comprising:
providing a liner (10) made of plastic or paper recyclable in a respective plastic or paper recycle stream and a heat seal layer that is also recyclable in the respective plastic or paper recycle stream;
positioning a removable and reusable induction heat seal application device (110) and the liner (10) above the rim (22L) of a container (20) to form a device/liner/rim assembly (110/10/22L); wherein:
the removable and reusable induction heat seal application device (110) comprises a metal disk positioned in a cap for securing the device to the liner and rim;
positioning an induction heat sealing head (8) above the device/liner/rim assembly (110/10/22L) and activating the sealing head (8) to inductively heat seal the liner (10) to the rim (22L);
removing the sealing head (18) and device (110) from the liner-sealed rim;
applying a container cap (40) over the liner-sealed rim;
reusing the device (110) for subsequent induction heat sealing of a liner to a container rim; and
recycling the liner, or the liner and one or more of the container cap (40) and the container (20) in the respective paper or plastic recycle stream(s).

10. A method of induction heat sealing a liner to a rim of a container comprising:
providing a liner (10) made of plastic or paper recyclable in a respective plastic or paper recycle stream and a heat seal layer that is also recyclable in the respective plastic or paper recycle stream;
positioning a removable and reusable induction heat seal application device (110) and the liner (10) above the rim (22L) of a container (20) to form a device/liner/rim assembly (110/10/22L);
positioning an induction heat sealing head (8) above the device/liner/rim assembly (110/10/22L) and activating the sealing head (8) to inductively heat seal the liner (10) to the rim (22L);
removing the sealing head (18) and device (110) from the liner-sealed rim;
applying a container cap (40) over the liner-sealed rim;
reusing the device (110) for subsequent induction heat sealing of a liner to a container rim; and
recycling the liner, or the liner and one or more of the container cap (40) and the container (20) in the respective paper or plastic recycle stream(s), wherein:
the removable and reusable induction heat seal application device (110) comprises a metal cap for securing the device to the liner and rim.

11. The apparatus of claim 6, wherein the cap (40), liner (10) and container (20) are each recyclable in a plastic recycle stream thus providing a fully recyclable cap, liner and container assembly.

12. The apparatus of claim 6, wherein the container (20) and cap (40) are each recyclable in a plastic, glass, paper or metal recycle stream thus providing a fully recyclable cap, liner and container assembly.

13. The apparatus of claim 7, wherein the cap (40), liner (10) and container (20) are each recyclable in a plastic recycle stream thus providing a fully recyclable cap, liner and container assembly.

14. The apparatus of claim 7, wherein the container (20) and cap (40) are each recyclable in a plastic, glass, paper or metal recycle stream thus providing a fully recyclable cap, liner and container assembly.

15. The apparatus of claim 8, wherein the cap (40), liner (10) and container (20) are each recyclable in a plastic recycle stream thus providing a fully recyclable cap, liner and container assembly.

16. The apparatus of claim 8, wherein the container (20) and cap (40) are each recyclable in a plastic, glass, paper or metal recycle stream thus providing a fully recyclable cap, liner and container assembly.

* * * * *